(12) United States Patent
Igarashi

(10) Patent No.: US 8,104,740 B2
(45) Date of Patent: Jan. 31, 2012

(54) FLOW CONTROL DEVICE

(75) Inventor: Hiroki Igarashi, Saitama (JP)

(73) Assignee: Surpass Industry Co., Ltd., Saitama (JP)

( * ) Notice: Subject to any disclaimer, the term of this patent is extended or adjusted under 35 U.S.C. 154(b) by 1004 days.

(21) Appl. No.: 11/813,358

(22) PCT Filed: Dec. 27, 2005

(86) PCT No.: PCT/JP2005/024232
§ 371 (c)(1),
(2), (4) Date: Jul. 5, 2007

(87) PCT Pub. No.: WO2006/073132
PCT Pub. Date: Jul. 13, 2006

(65) Prior Publication Data
US 2008/0110506 A1    May 15, 2008

(30) Foreign Application Priority Data
Jan. 7, 2005   (JP) ................ 2005-002225

(51) Int. Cl.
*F16K 31/00* (2006.01)
(52) U.S. Cl. ........ 251/61.2; 251/331; 251/332; 251/360
(58) Field of Classification Search ............ 251/61, 251/61.2, 61.3, 331, 335.2, 63, 333, 360, 251/358, 359, 332; 137/510, 509, 488, 505.34, 137/505.36
See application file for complete search history.

(56) References Cited

U.S. PATENT DOCUMENTS

| | | | | |
|---|---|---|---|---|
| 2,577,967 A | * | 12/1951 | Hughes | 251/25 |
| 2,806,481 A | * | 9/1957 | Faust | 137/505.3 |
| 3,356,101 A | * | 12/1967 | Tacchi | 251/61 |
| 3,366,315 A | * | 1/1968 | Alberani | 251/28 |
| 4,376,526 A | * | 3/1983 | Freeman | 251/328 |
| 4,694,848 A | * | 9/1987 | Jorgensen et al. | 137/114 |
| 4,821,776 A | * | 4/1989 | Ariizumi et al. | 137/625.4 |

(Continued)

FOREIGN PATENT DOCUMENTS
JP     63-33063    3/1988
(Continued)

*Primary Examiner* — John Fristoe, Jr.
*Assistant Examiner* — Andrew J Rost
(74) *Attorney, Agent, or Firm* — Dorsey & Whitney LLP

(57) ABSTRACT

A flow control device is provided comprising: a housing (19) including a first chamber (21) communicated with an inlet port (11) and a second chamber (22) communicated with an outlet port (12); a cylindrical portion (25), which extends in the second chamber, for communicating the first chamber with the second chamber; a valve seat (61) provided at a forward end portion (25*a*) of the cylindrical portion; and a valve body (32) for opening and closing the valve seat, wherein at least one of the valve seat and the valve body is made of a material, the heat deformation of which is smaller than that of material composing the cylindrical portion. Due to the foregoing, it is possible to stably adjust the flow rate of a fluid of a high temperature and pressure. A pressure chamber (29), which is communicated with the second chamber and provided with a pressure port (18), may be arranged in the housing. A first and second flexible separation means (41, 51), which are connected to each other, for separating the second chamber and the pressure chamber from each other may be provided and a bed (75) arranged between the first and the second flexible separation means may be also provided. A reinforcement member (90) may be embedded in the cylindrical portion (25).

18 Claims, 8 Drawing Sheets

U.S. PATENT DOCUMENTS

| | | | |
|---|---|---|---|
| 5,107,887 A * | 4/1992 | White et al. | 251/331 |
| 5,261,442 A * | 11/1993 | Kingsford et al. | 251/61.3 |
| 5,924,441 A * | 7/1999 | Leys et al. | 251/335.2 |
| 6,047,726 A * | 4/2000 | Kaneshige | 251/368 |
| 6,321,776 B1 | 11/2001 | Pratt et al. | |
| 6,382,591 B1 * | 5/2002 | Bowers et al. | 251/309 |

FOREIGN PATENT DOCUMENTS

| | | |
|---|---|---|
| JP | 63-74565 | 5/1988 |
| JP | 09-210236 | 8/1997 |
| JP | 2002-081564 | 3/2002 |
| JP | 2004-162774 | 10/2004 |

* cited by examiner

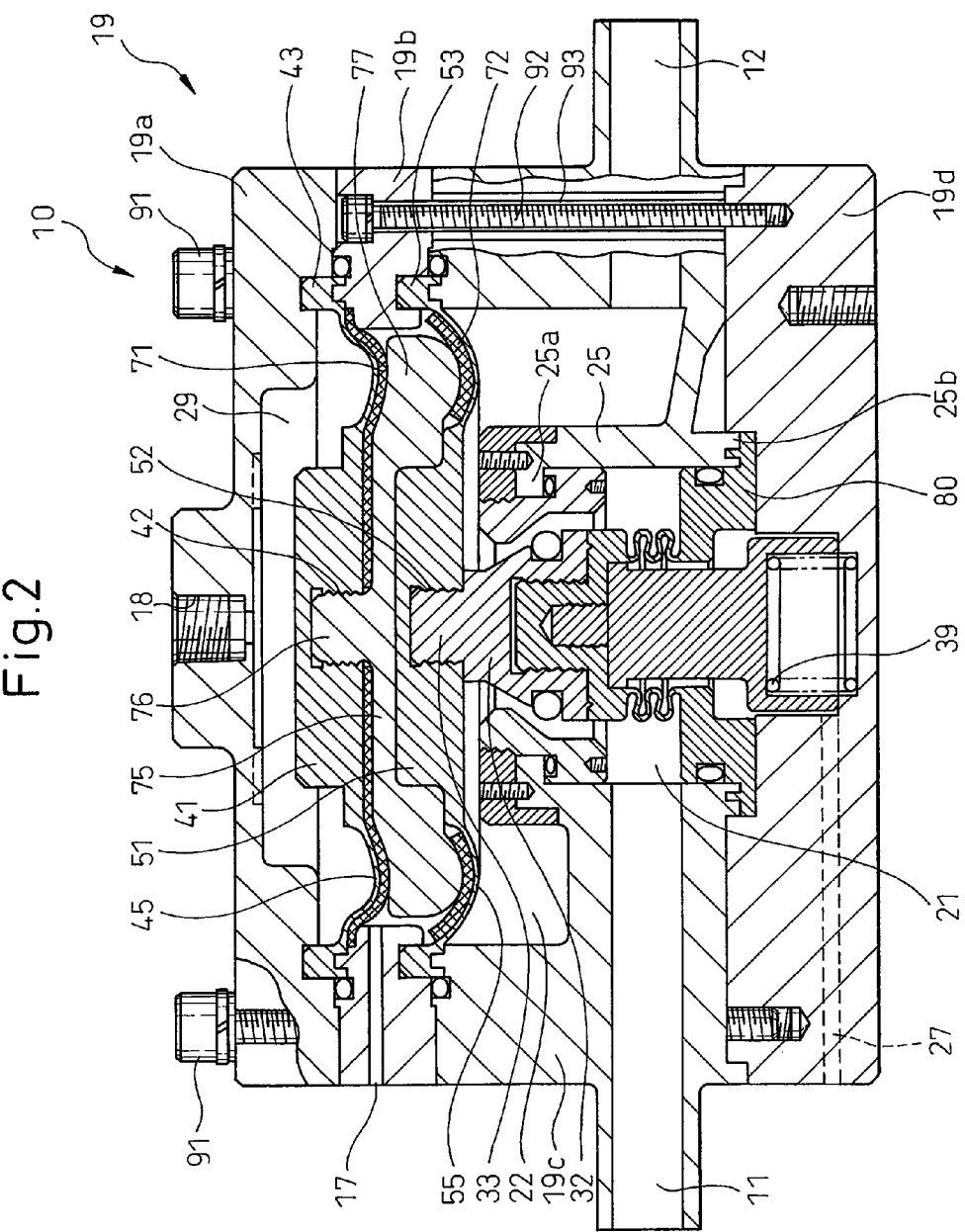

FLOW CONTROL DEVICE

TECHNICAL FIELD

The present invention relates to a flow control device for controlling the flow rate of a fluid. Especially, the present invention relates to a flow control device for controlling the flow rate of steam of high temperature and pressure.

BACKGROUND ART

At the time of manufacturing semiconductors, especially at the time of cleaning wafers, it is necessary to supply a highly pure fluid, for example, highly pure hydrochloric acid by a desired flow rate. Therefore, according to the prior art, a flow rate control device shown in FIG. 8, that is, a flow regulating valve is used to control the flow rate of fluid to be supplied.

FIG. 8 is a sectional view showing a flow rate control device of the prior art, such as disclosed in Japanese Unexamined Patent Publication No. 2004-162774. A housing 190 of the flow rate control device 100 is made of resin. On the outside of the housing 190, an inlet port 110 and an outlet port 120 for fluid are respectively arranged. The housing 190 includes a first chamber 210 communicated with an inlet port 110 and a second chamber 220 communicated with an outlet port 120. Between the first chamber 210 and the second chamber 220, a valve seat 310 and valve body 320, which corresponds to the valve seat 310, are arranged. As shown in the drawing, a diaphragm 410 is fixed to an upper end face of the valve body 320. Further, a spring 390 for pushing the valve body 320 against the valve seat 310 is attached to a lower end portion of the valve body 320.

On the opposite side of the second chamber 220 with respect to the diaphragm 410, that is, in an upper portion of the diaphragm 410, an airtightly closed pressure chamber 290 is formed. This pressure chamber 290 is communicated with a pressure introduction port 180 formed on the top face of the housing 190.

When air is introduced from the pressure introduction port 180, the pressure chamber 290 is pressurized and the diaphragm 410 pushes the valve body 320 downward against the spring 390. Due to the foregoing, the valve body 320 is separated from the valve seat 310 and fluid flows from the first chamber 210 into the second chamber 220 and is discharged from the outlet port 120. When the pressure of air introduced into the pressure introduction port 180 is adjusted, the distance the valve body 320 moves according to an action of the diaphragm 410 is controlled. Due to the foregoing, the flow rate of fluid discharged from the outlet port 120 can be adjusted.

However, a flow rate control device made of resin, which is disclosed in Japanese Unexamined Patent Publication No. 2004-162774, can adjust the flow rate of a fluid of ordinary temperature and normal pressure. Accordingly, when the flow rate control device is used to adjust the flow rate of fluid, over a long period of time, temperature and pressure of which are high, for example, to adjust the flow rate of steam, there is a possibility that a portion of the flow rate control device may be damaged. Especially, since the valve body of the flow rate control device is reciprocated in a fluid of high temperature and pressure. Therefore, the valve body and valve seat are parts that may become damaged due to a lack of durability. Even if there is a slight amount of damage in the valve body and/or the valve seat, the flow rate of fluid supplied by the flow rate control device may be greatly changed from a desired flow rate.

Further, in the flow rate control device disclosed in Japanese Unexamined Patent Publication No. 2004-162774, one face of the diaphragm is exposed to fluid, the flow rate of which must be adjusted and the other face of the diaphragm is exposed to fluid which is charged in the pressure chamber. Therefore, in the case where a flow rate of fluid of a high temperature and pressure is adjusted, for example, in the case where a flow rate of steam is adjusted, the fluid of a high temperature and pressure and the fluid charged in the pressure chamber are adjacent to each other via a single diaphragm, which is a relatively thin film. Accordingly, the diaphragm may become damaged.

The present invention has been accomplished in view of the above circumstances. An object of the present invention is to provide a flow rate control device capable of stably controlling flow rate even when a flow rate of fluid of high temperature and pressure, for example, steam is adjusted with the flow rate control device.

DISCLOSURE OF THE INVENTION

In order to accomplish the above object, according to the first aspect, there is provided a flow control device comprising: a housing including a first chamber communicated with an inlet port and a second chamber communicated with an outlet port; a cylindrical portion, which extends in the second chamber, for communicating the first chamber with the second chamber; a valve seat provided at a forward end portion of the cylindrical portion; and a valve body for opening and closing the valve seat, wherein at least one of the valve seat and the valve body is made of material, the heat deformation of which is smaller than that of material composing the cylindrical portion.

In the first aspect, the amount of heat deformation of the material of the valve seat and/or the valve body is small. Therefore, even when the flow rate control device of the first aspect is used for adjusting a flow rate of fluid of high temperature and pressure, for example, steam, it is possible to ensure the durability of the valve seat and/or the valve body. Accordingly, the flow rate can be stably adjusted without causing damage to the valve seat and/or the valve body. In the case where the cylindrical portion is made of resin, it is preferable that the valve body and/or valve seat be made of metal, for example, titanium. Alternatively, it is preferable that the valve body and/or valve seat be made of polyether etherketone (PEEK).

According to the second aspect, there is provided a flow control device comprising: a housing including a first chamber communicated with an inlet port and a second chamber communicated with an outlet port; a cylindrical portion, which extends in the second chamber, for communicating the first chamber with the second chamber; a valve seat provided at a forward end portion of the cylindrical portion; and a valve body for opening and closing the valve seat, wherein a reinforcement member made of a material of which the heat deformation is smaller than that of a material composing the cylindrical portion, is at least partially embedded in the cylindrical portion.

In the second aspect, the reinforcement member can prevent expansion of the cylindrical portion in the radial direction, which is caused when a fluid of high temperature and pressure passes through the cylindrical portion. Especially in the case where the cylindrical portion is made of fluororesin, it is possible to supply a liquid drug of high temperature and pressure. In this connection, it is preferable that the reinforcing member be made of metal, for example, titanium. Alternatively, it is preferable that the reinforcing member be made of polyether etherketone (PEEK).

According to the third aspect, there is provided a flow control device comprising: a housing including a first chamber communicated with an inlet port and a second chamber communicated with an outlet port; a cylindrical portion, which extends in the second chamber, for communicating the first chamber with the second chamber; a valve seat provided at a forward end portion of the cylindrical portion; a valve body for opening and closing the valve seat; a closing portion for closing a proximal end of the cylindrical portion; and a cup-shaped support portion for surrounding and supporting the cylindrical portion while receiving the closing portion.

In the third aspect, the cylindrical portion is supported by the cup-shaped support portion. Therefore, even when steam is supplied, it is possible to suppress leakage of steam caused when parts are deformed.

According to the fourth aspect, as in one of the first to the third aspects, a flow rate control device further comprises a tightening means for tightening the circumference of the foreword end portion of the cylindrical portion.

According to the fourth aspect, in the case where fluid of a high temperature and pressure passes through the cylindrical portion, it is possible to prevent expansion of the cylindrical portion in the radial direction and formation of the gap between the valve body and the valve seat.

According to the fifth aspect, as in one of the first to the fourth aspects, a flow rate control device further comprises a valve body seal means for sealing the valve body, arranged in a portion of the valve body coming into contact with the valve seat.

In the fifth aspect, even in the case where fluid of a high temperature and pressure passes through the cylindrical portion and a small gap is formed between the valve body and the valve seat, this gap can be filled by a valve body sealing means, for example, an O-ring.

According to the sixth aspect, as in the first to the fifth aspects, a flow rate control device further comprises: a pressure chamber arranged in the housing, the pressure chamber is communicated with the second chamber and has a pressure port; a first and a second flexible separation means, which are connected to each other, for separately sealing the second chamber and the pressure chamber from each other, wherein the first flexible separation means is exposed to fluid in the pressure chamber and the second flexible separation means is exposed to fluid in the second chamber and is connected to the valve body; and a bed arranged between the first and the second flexible separation means.

According to the sixth aspect, a space is formed between the first and the second flexible separation means. Therefore, fluid of a high temperature and pressure in the second chamber and fluid in the pressure chamber are not adjacent to each other via a single flexible separation means. Accordingly, these flexible separation means are prevented from being damaged by the fluid of high temperature and pressure.

According to the seventh aspect, as in the sixth aspect, an elastic member is arranged at least at one position, which is located between the first flexible separation means and the bed, and the position which is located between the second flexible separation means and the bed.

In the seventh aspect, damage of the first and the second flexible separation means can be prevented by the elastic member.

According to the eighth aspect, as in the sixth or the seventh aspect, an exhaust passage is formed in the housing at the position between the first and the second flexible separation means.

In the eighth aspect, a space between the first and the second flexible separation means is open to atmospheric air. Due to the foregoing, heat deformation of the first and the second flexible separation means can be suppressed to some degree.

According to the ninth aspect, as in one of the sixth to the eighth aspects, a flow rate control device further comprises: a closing portion for closing a proximal end of the cylindrical portion, wherein the valve body is movably connected to the closing portion; and a seal means arranged in at least one of the position, which is located between the inner wall of the cylindrical portion and the closing portion, and the position which is located between the proximal edge portion of the cylindrical portion and the closing portion.

In the ninth aspect, in the case where fluid of a high temperature and pressure passes through the cylindrical portion and thus the cylindrical portion expands in the radial direction, leakage of fluid from between the closing portion and the cylindrical portion can be prevented. For example, the seal means provided between the inner wall of the cylindrical portion and the closing portion is an O-ring. The seal means provided between the proximal end edge portion of the cylindrical portion and the closing portion is a protrusion and a recess portion for receiving the protrusion.

According to the tenth aspect, a flow control device comprises: a housing including a first chamber communicated with an inlet port and a second chamber communicated with an outlet port, the housing also including a pressure chamber communicated with the second chamber and having a pressure port; a cylindrical portion, which extends in the second chamber, for communicating the first chamber with the second chamber; a valve seat provided at a forward end portion of the cylindrical portion; a valve body for opening and closing the valve seat; a first and a second flexible separation means, which are connected to each other, for sealingly separating the second chamber and the pressure chamber from each other, wherein the first flexible separation means is exposed to fluid in the pressure chamber and the second flexible separation means is exposed to fluid in the second chamber and is connected to the valve body; and a bed arranged between the first and the second flexible separation means.

According to the tenth aspect, a space is formed between the first and the second flexible separation means. Therefore, fluid of a high temperature and pressure in the second chamber and fluid in the pressure chamber are not adjacent to each other via a single flexible separation means. Accordingly, these flexible separation means are prevented from being damaged by fluid of a high temperature and pressure.

According to the eleventh aspect, as in the tenth aspect, an elastic member is arranged at least one of the position, which is located between the first flexible separation means and the bed, and the position, which is located between the second flexible separation means and the bed.

In the eleventh aspect, damage of the first and the second flexible separation means can be prevented by the elastic member.

According to the twelfth aspect, as in the tenth or the eleventh aspect, an exhaust passage is formed in the housing at the position between the first and the second flexible separation means.

In the twelfth aspect, a space between the first and the second flexible separation means is open to atmospheric air. Due to the foregoing, heat deformation of the first and the second flexible separation means can be suppressed to some degree.

According to the thirteenth aspect, as in one of the tenth to the twelfth aspects, a flow rate control device further comprises: a closing portion for closing a proximal end of the cylindrical portion, wherein the valve body is movably connected to the closing portion; and a seal means arranged in at least one of the position, which is located between the inner wall of the cylindrical portion and the closing portion, and the position which is located between the base edge portion of the cylindrical portion and the closing portion.

In the thirteenth aspect, in the case where fluid of a high temperature and pressure passes through the cylindrical portion and thus the cylindrical portion is expanded in the radial direction, leakage of fluid from between the closing portion and the cylindrical portion can be prevented. For example, the seal means provided between the inner wall of the cylindrical portion and the closing portion is an O-ring. The seal means provided between the proximal end edge portion of the cylindrical portion and the closing portion is a protrusion and a recess portion for receiving the protrusion.

According to the fourteenth aspect, as in one of the tenth to the thirteenth aspects, a reinforcement member made of material, the amount of the heat deformation of which is smaller than that of material composing the cylindrical portion, is at least partially embedded in the cylindrical portion.

In the fourteenth aspect, the reinforcement member can prevent expansion of the cylindrical portion, which is caused when fluid of a high temperature and pressure has passed through the cylindrical portion. Accordingly, all portions coming into contact with supplied liquid can be made of fluororesin. Therefore, even when a liquid drug of a high temperature and pressure is supplied, especially even when a highly pure liquid drug is supplied, it is possible to prevent metallic ions from flowing out from portions coming into contact with the liquid drug.

According to the fifteenth aspect, as in one of the tenth to the thirteenth aspects, at least one of the valve seat and the valve body is made of material, the heat deformation of which is smaller than that of material composing the cylindrical portion.

In the fifteenth aspect, heat deformation of the valve seat and/or the valve body is relatively small so that the durability of the valve seat and/or the valve body can be ensured even when a flow rate control device according to the first aspect is used for adjusting a flow rate of fluid of a high temperature and pressure, for example, for adjusting a flow rate of steam. Accordingly, it is possible to stably adjust a flow rate without damaging the valve seat and/or the valve body.

According to the sixteenth aspect, as in the tenth to the fifteenth embodiments, a flow rate control device further comprises a tightening means for tightening a circumference of a foreword end portion of the cylindrical portion.

In the sixteenth aspect, in the case where fluid of a high temperature and pressure passes through the cylindrical portion, expansion of the cylindrical portion in the radial direction can be prevented.

According to the seventeenth aspect, as in one of the tenth to the fifteenth aspects, a flow rate control device further comprises a valve body seal means for sealing the valve body, arranged in a portion of the valve body coming into contact with the valve seat.

According to the seventeenth aspect, even when fluid of a high temperature and pressure passes through the cylindrical portion and a small gap is formed between the valve body and the valve seat, this gap can be filled by the valve body seal means, for example, an O-ring.

According to each aspect described above, the following advantages can be provided in common. Even in the case where a flow rate of fluid of a high temperature and pressure is adjusted, for example, a flow rate of steam is adjusted, the flow rate can be stably adjusted.

Further, according to the fourth and the sixteenth aspects, it is possible to provide an advantage that a formation of a gap between the valve body and the valve seat is prevented.

Further, according to the fifth and the seventeenth aspects, it is possible to provide an advantage that a gap formed between the valve body and the valve seat is filled by the valve body seal means.

Further, according to the sixth aspect, it is possible to provide an advantage that damage of the flexible separation means, which is caused by fluid of high temperature and pressure, is prevented.

Further, according to the seventh aspect, it is possible to provide an advantage that damage of the first and the second flexible separation means can be prevented by the elastic member.

Further, according to the eighth aspect, it is possible to provide an advantage that heat deformation of the first and the second flexible separation means is suppressed to some degree.

Further, according to the ninth aspect, it is possible to provide an advantage that leakage of fluid from between the closing portion and the cylindrical portion can be prevented.

Further, according to the tenth aspect, it is possible to provide an advantage that damage of the flexible separation means, which is caused by fluid of high temperature and pressure, can be prevented.

Further, according to the eleventh aspect, it is possible to provide an advantage that damage of the first and the second flexible separation means can be prevented by the elastic member.

Further, according to the twelfth aspect, it is possible to provide an advantage that heat deformation of the first and the second flexible separation means can be suppressed to some degree.

Further, according to the thirteenth aspect, it is possible to provide an advantage that leakage of fluid from between the closing portion and the cylindrical portion can be prevented.

Further, according to the fourteenth aspect, it is possible to provide an advantage that an expansion of the cylindrical portion in the radial direction, which is caused when fluid of a high temperature and pressure passes through the cylindrical portion, can be prevented by the reinforcement member.

These and other objects, features and advantages of the present invention will be more apparent from the detailed description of typical embodiments shown in the accompanying drawings of the present invention.

BRIEF DESCRIPTION OF THE DRAWINGS

FIG. 1b is a top face view of the flow rate control device illustrated in FIG. 1a.

FIG. 2 is a sectional side view showing a state of opening a valve of the flow rate control device of the first embodiment of the present invention.

FIG. 7b is an end face view showing the flow rate control device shown in FIG. 7a.

BEST MODE FOR CARRYING OUT THE INVENTION

Figure 1A:
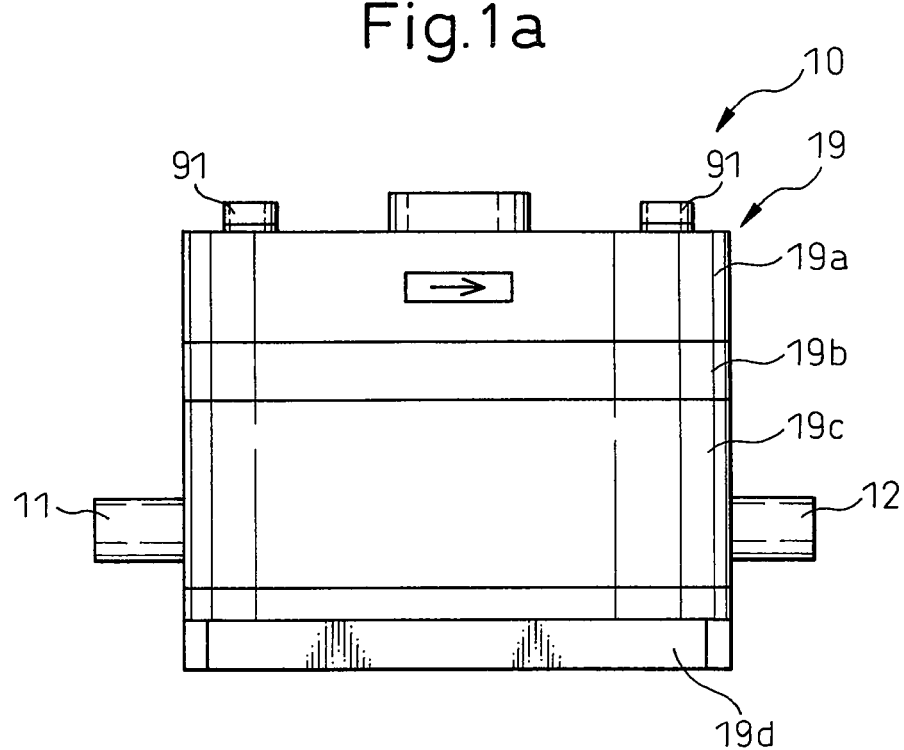
FIG. 1a is a side view showing a flow rate control device of the first embodiment of the present invention.

Referring to the accompanying drawings, the embodiments of the present invention will be explained below. Like reference numerals are used to indicate like parts in the following drawings. In order to facilitate understanding, the scale has been appropriately changed in the drawings.

Figure 1B:
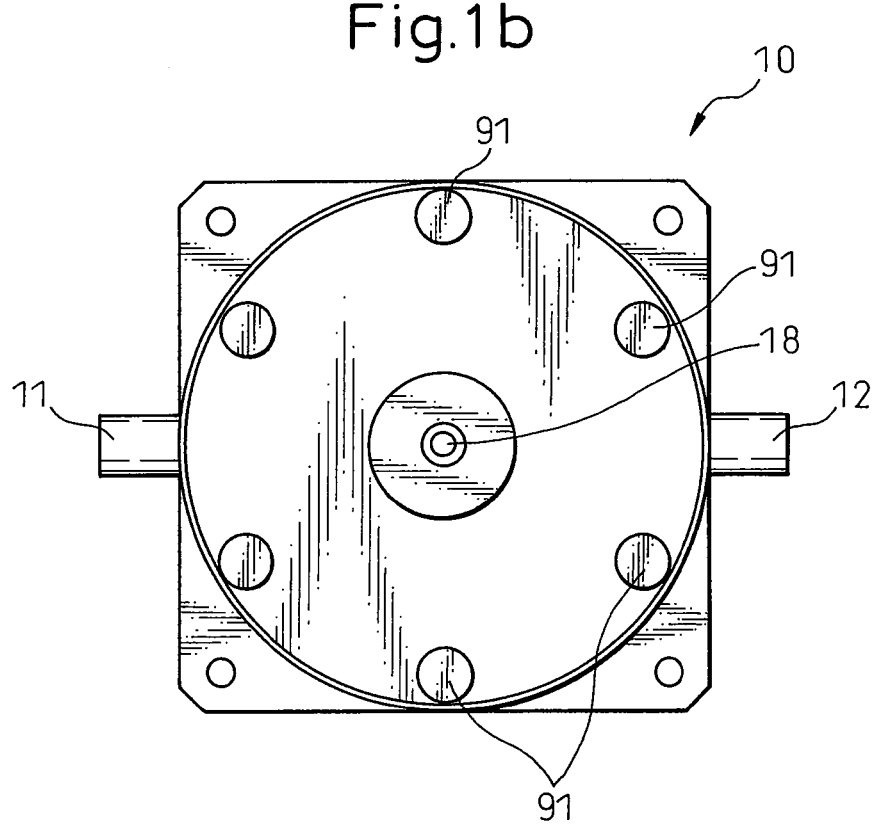

FIG. 1a is a side view showing a flow rate control device of the first embodiment of the present invention. FIG. 1b is a top face view of the flow rate control device illustrated in FIG. 1a. A housing 19 of a flow rate control device 10 of the first embodiment of the present invention includes four parts of a housing lid portion 19a, a housing annular portion 19b, a housing barrel portion 19c and a housing bottom portion 19d. The housing annular portion 19b supports a first diaphragm 41 and a second diaphragm 51, which will be described later, in the flow rate control device 10. An inlet port 11 and an outlet port 12 extending outside are respectively formed in the housing barrel portion 19c. As described later, a passage of fluid supplied by the flow rate control device 10 is formed only in the housing barrel portion 19c.

The housing barrel portion 19c is made of a material, the chemical resistance of which is excellent, such as polypropylene or fluororesin. The other parts, that is, the housing lid portion 19a, the housing annular portion 19b and the housing bottom portion 19d are made of a metallic material such as stainless steel so that mechanical strength can be enhanced. However, the housing lid portion 19a, the housing annular portion 19b and the housing bottom portion 19d may be made of the same material as that of the housing barrel portion 19c.

As shown in FIGS. 1a and 1b, the housing annular portion 19b and the housing barrel portion 19c are arranged being interposed between the housing lid portion 19a and the housing bottom portion 19d. The housing 19 composed in this way is formed into a substantial cylindrical shape.

Figure 3:
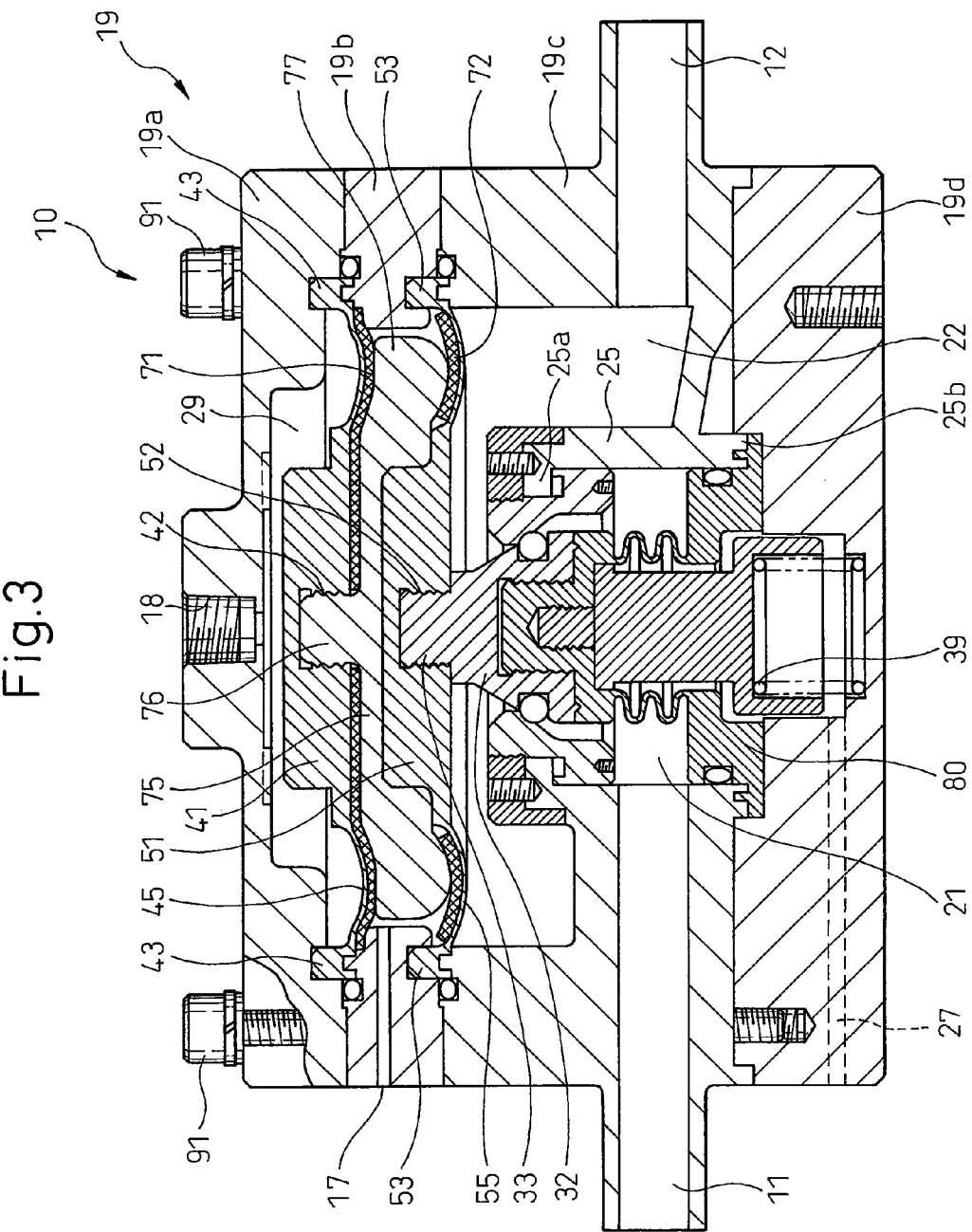
FIG. 3 is a sectional side view showing a state of closing a valve of the flow rate control device of the first embodiment of the present invention.

FIGS. 2 and 3 are sectional side views respectively showing a state of opening the valve and closing the valve of the flow rate control device of the first embodiment of the present invention. As can be seen from FIGS. 1 to 3, a plurality of screws 91, which are arranged at regular intervals in the circumferential direction, attach and support parts 19a to 19d of the housing. As shown in the drawing, when the housing annular portion 19b and the housing bottom portion 19d are attached by the other screws 92, the housing barrel portion 19c between the housing annular portion 19b and the housing bottom portion 19d, can be also supported. A pipe 93 is arranged around the barrel portion of the screw 92 in FIG. 2.

As shown in FIGS. 2 and 3, the inlet port 11 is communicated with a first chamber 21 of a cylindrical portion 25, which is formed integrally with the housing barrel portion 19c. The outlet port 12 is communicated with a second chamber 22 which is formed in the housing barrel portion 19c. The cylindrical portion 25 extends into the second chamber 22. As shown in the drawing, a proximal end 25b of the cylindrical portion 25 is closed by a closing portion 80. On the other hand, at a forward end portion 25a of the cylindrical portion 25, a valve seat, which will described later, is arranged. The first chamber 21 and the second chamber 22 communicate with each other through the valve seat of the cylindrical portion 25. A valve body 32 engaged with this valve seat is arranged being capable of reciprocating in the axial direction of the cylindrical portion 25 in the first chamber 21.

In this embodiment, the valve body 32 is made of the same material as that of the cylindrical portion 25. As described before, the cylindrical portion 25 is made of the same material as that of the housing barrel portion 19c, for example, the cylindrical portion 25 is made of polypropylene or fluororesin. However, the valve body 32 may be made of a material, the heat deformation of which is smaller than that of the material of the cylindrical portion 25. For example, the valve body 32 may be made of titanium or PEEK.

The first diaphragm 41 separates the housing lid portion 19a and the housing annular portion 19b from each other so that they can be sealed from each other. The first diaphragm 41 is an integrally formed member made of resin including an annular thin film portion 45, which is arranged around the disk-shaped body, and an annular edge portion 43, which is arranged around the annular thin film portion 45. The annular thin film portion 45 is slightly curved so that it can protrude toward the second chamber 22. The annular edge portion 43 is arranged in recess grooves formed in both the housing lid portion 19a and the housing annular portion 19b. Due to the foregoing, the first diaphragm 41 is supported between the housing lid portion 19a and the housing annular portion 19b.

Since the first diaphragm 41 separates the housing lid portion 19a and the housing annular portion 19b from each other so that they can be sealed from each other, a pressure chamber 29, which is separate from the second chamber 22, is formed between the housing lid portion 19a and the first diaphragm 41. This pressure chamber 29 is communicated with the pressure introduction port 18 formed in the top portion of the housing lid portion 19a.

As shown in the drawing, a hole 42 is formed in the bottom portion of the first diaphragm 41. A protruding end portion 76 of the bed 75 engages with the hole 42 of the first diaphragm 41. After engagement, the upper diaphragm 41 and the bed 75 may be connected to each other by threading a screw (not shown) into the engagement portion. The bed 75 includes an annular curved portion 77 arranged around the disk-shaped body. As shown in the drawing, an upper face of the annular curved portion 77 is formed into a recessed face corresponding to the annular thin film portion 45 of the first diaphragm 41. A lower face of the annular curved portion 77 is curved downward from the body of the bed 75. A lower face of the annular curved portion 77 is formed into a shape corresponding to the annular thin film portion 55 of the second diaphragm 51 described later.

Further, an elastic member, for example, a rubber sheet 71 is interposed between the annular curved portion 77 of the bed 75 and the annular thin film portion 45 of the first diaphragm 41. Since a protruding end portion 76 of the bed 75 is inserted into the hole formed on the rubber sheet 71 as shown in the drawing, the rubber sheet 71 is also interposed between the first diaphragm 41 body and the bed 75 body.

Further, the second diaphragm 51, the structure of which is the same as that of the first diaphragm 41, is connected to the bed 75. As shown in the drawing, the second diaphragm 51 body is inserted onto the inner circumferential face of the annular curved portion 77 of the bed 75. An annular edge portion 53 of the second diaphragm 51 is arranged in recess grooves formed in both the housing annular portion 19b and the housing barrel portion 19c. Due to the above structure, the second diaphragm 51 is supported between the housing annular portion 19b and the housing barrel portion 19c. Further, as can be seen from FIGS. 2 and 3, an annular elastic member, for example, a rubber sheet 72 is interposed between the annular curved portion 77 of the bed 75 and the annular thin film portion 55 of the second diaphragm 51. As shown in the drawing, a hole 52 formed on the lower face of the second diaphragm 51 is screwed to the forward end 33 of the valve body 32.

A space, in which the bed 75 is arranged, is sealingly separated from both the pressure chamber 29 and the second chamber 22 by the first diaphragm 41 and the second diaphragm 51. Accordingly, an upper face of the first diaphragm 41 is exposed to fluid in the pressure chamber 29 and a lower face of the second diaphragm 51 is exposed to fluid in the second chamber 22. In this connection, the first diaphragm 41 does not come into contact with fluid flowing from the inlet port 11. The first diaphragm 41 is only receives pressure transmitted from the pressure introduction port 18. Therefore, the first diaphragm 41 may be excluded and another rubber sheet, on which the first diaphragm 41 and the rubber sheet 71 are integrated with each other into one body, may be used instead of the first diaphragm 41.

As shown on the left in FIGS. 2 and 3, a ventilation port 17, which is formed in the housing annular portion 19b, extends to the space in which the bed 75 is arranged. It is preferable that a seal member, for example, an O-ring is arranged around the annular edge portion 43 of the first diaphragm 41. Due to the foregoing, the pressure chamber 29 and the bed 75 can be more completely separated from each other. It is also preferable that the similar seal member is arranged around the annular edge portion 53 of the second diaphragm 51 in the same manner so as to more completely separate the space, in which the bed 75 is arranged, and the second chamber 22 from each other.

Figure 4:
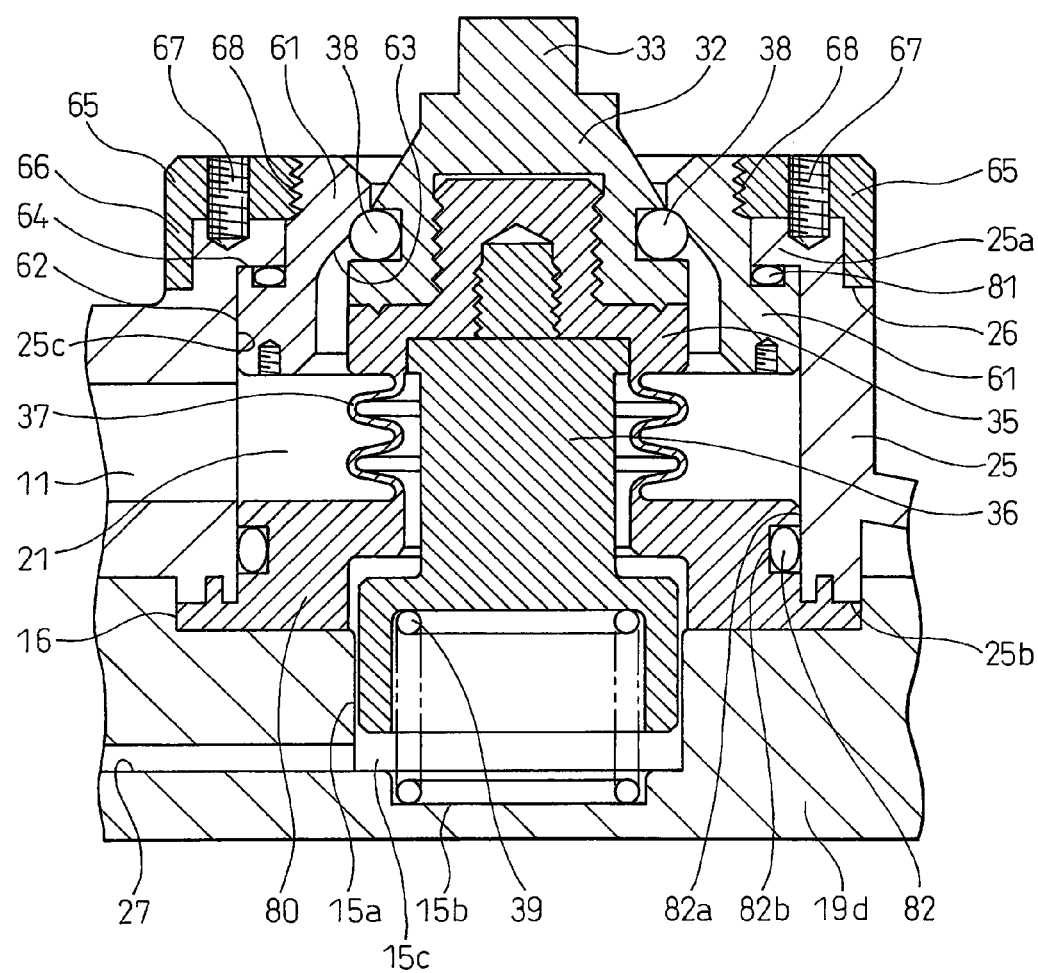
FIG. 4 is a partial enlarged view in which a valve body of the flow rate control device is shown being enlarged.

FIG. 4 is a partial enlarged view in which the valve body of the flow rate control device is shown being enlarged. As shown in FIG. 4, a connecting member 35, which is connected to a lower end of the valve body 32, is connected to a sliding member 36. For example, the connecting member 35 and the sliding member 36 are made of polypropylene or fluororesin. In the case where the valve body 32 is made of polypropylene or fluororesin, the valve body 32, the connecting member 35 and the sliding member 36 may be integrally formed into one component. A lower end portion of the sliding member 36 passes through the closing portion 80 and extends to the sliding groove 15a formed in the housing bottom portion 19d. Further, a recess portion 15b is formed in the sliding groove 15a. An elastic member, for example, a spring 39 is arranged between the lower end portion of the sliding member 36 and the recess portion 15b. This spring 39 pushes the sliding member 36 upward under normal conditions. That is, the valve body 32, which is connected to the sliding member 36 via the connecting member 35, is pushed to the valve seat by the spring 39 under normal conditions. On a surface of the valve body 32 engaged with the valve seat, a seal means, for example, an O-ring 38 is arranged. This O-ring 38 functions in such a manner that especially when fluid of a high temperature and pressure passes through the cylindrical portion 25, the O-ring 38 fills a gap formed between the valve body 32 and the valve seat 61 so that the valve hole can be completely closed at the time of closing the valve. In this connection, a bellows 37 provided on the side of the sliding member 36 prevents fluid in the first chamber 21 from leaking through a gap formed between the sliding member 36 and the closing portion 80.

As shown in FIG. 4, the valve seat 61 corresponding to the valve body 32 is a substantially sleeve-shaped member having an inside inclined face 63 to be engaged with the valve body 32. In an outer circumferential portion of the valve seat 61, a step portion 64 is formed toward the inside in the radial direction.

In the first embodiment shown in FIGS. 1 to 4, the valve seat 61 is made of a material, the heat deformation of which is smaller than that of the cylindrical portion 25. As described before, the cylindrical portion 25 is made of the same material as that of the housing barrel portion 19c. For example, the cylindrical portion 25 is made of polypropylene or fluororesin. Therefore, for example, the valve seat 61 is made of titanium or PEEK. It is preferable that the valve seat 61 be made of the same material as that of the valve body 32. However, as long as the heat deformation of the material is smaller than that of the cylindrical portion 25, the valve seat 61 may be made of a material different from that of the valve body 32.

On the other hand, a forward end 25a of the cylindrical portion 25 extends inside in the radial direction. On an outer circumferential face of the forward end 25a, a step portion 26 is formed toward the inside in the radial direction. Accordingly, as shown in the drawing, the outer circumferential face 62 of the valve seat 61 is engaged with the inner circumferential face 25c of the cylindrical portion 25. The step portion 64 of the valve seat 61 is engaged with a lower face of the portion 25a extending inside in the radial direction of the cylindrical portion 25. In this connection, an O-ring 81 is arranged between the step portion 64 of the valve seat 61 and the portion 25a extending inside in the radial direction of the cylindrical portion 25. The O-ring 81 prevents fluid in the first chamber 21 from leaking through a gap formed between the valve seat 61 and the portion 25a and from flowing into the second chamber 22.

Further, as shown in FIG. 4, there is provided a tightening member 65 for tightening the outer circumferential portion of the cylindrical portion 25. In the same manner as that of the valve seat 61, the tightening member 65 is made of a material, the heat deformation of which is smaller than that of the cylindrical portion 25, for example titanium or PEEK. It is preferable that the tightening member 65 is made of the same material as that of the valve body 32 and the valve seat 61. However, as long as the heat deformation of the material is smaller than that of the cylindrical portion 25, the tightening member 65 may be made of a material different from the material of the valve body 32 and the valve seat 61.

When it is estimated that fluid of high temperature and pressure, for example, steam is supplied to the flow rate control device 10 in which the valve seat 61 is screwed into the cylindrical portion 25 without the tightening member 65, since the cylindrical portion 25 is deformed by heat and pressure, there is a possibility that fluid will leak out through a gap between the portion 25a of the cylindrical portion 25 and the valve seat 61. On the other hand, in the flow rate control device 10 including the tightening member 65, the tightening member 65 tightens the cylindrical portion 25 from the circumferential portion thereof so that the cylindrical portion 25 can be prevented from being expanded in the radial direction. Therefore, it is preferable to use the valve seat 61, the heat deformation of which is relatively small. In addition to that, it is preferable to use the tightening member 65, the heat deformation of which is small in the same way.

Due to the foregoing, it is possible to prevent leakage of fluid from a gap between the portion 25a and the valve seat 61.

The tightening member 65, the shape of which is formed into a substantial ring-shape, has an extension portion 66 extending downward. As shown in the drawing, a lower face of the tightening member 65 is engaged with a top face of the forward end 25a of the cylindrical portion 25. The extension portion 66 of the tightening member 65 is engaged with the step portion 26 of the cylindrical portion 25. Due to the foregoing, an outer circumferential face of the tightening member 65 and an outer circumferential face of the cylindrical portion 25 can be set on the same plane. On the inner circumferential face 68 of the tightening member 65, a screw thread is formed. This screw thread is screwed to the corresponding screw thread formed on the outer circumferential face of the valve seat 61. In this connection, as shown in FIG. 4, the tightening member 65 is fixed to the forward end 25a of the cylindrical portion 25 by a screw 67 inserted into a hole formed in the tightening member 65.

Accordingly, when parts are incorporated in the housing barrel portion 19c, first, the valve seat 61 is inserted from the proximal end portion 25b of the cylindrical portion 25 and then engaged with the forward end 25a of the cylindrical portion 25. Then, the valve body 32 previously assembled to the closing portion 80 is made to pass through a valve hole of the valve seat 61 and the proximal end 25b of the cylindrical portion 25 is closed by the closing portion 80. After that, the tightening member 65 is inserted into the forward end 33 of the valve body 32 and arranged at the forward end 25a of the cylindrical portion 25. Then, the tightening member 65 is rotated so as to screw the tightening member 65 and the valve seat 61 to each other. Finally, the tightening member 65 is fixed to the forward end 25a of the cylindrical portion 25 by the screw 67. Due to the foregoing, a portion of the housing barrel portion 19c shown in FIG. 4 is formed. After that, the housing lid portion 19a, the housing annular portion 19b and the housing barrel portion 19c are properly incorporated to each other. In this way, the flow rate control device 10 shown in FIG. 1 is assembled.

At the time of operating the flow rate control device 10, the inlet port 11 and the outlet port 12 are connected to a predetermined piping system. In the beginning, the valve body 32 is engaged with the valve seat 61, that is, the valve is in a closed state. Concerning this matter, refer to FIG. 3. Thus, fluid sent from the piping system passes through the inlet port 11 and arrives at the first chamber 21. Next, when another fluid, for example, air is introduced into the pressure introduction port 18, the pressure chamber 29 is pressurized. Due to the foregoing, the first diaphragm 41 is pushed downward by the pressure in the pressure chamber 29, that is, the first diaphragm 41 is pushed in the valve opening direction. As described before, the first diaphragm 41 is connected to the second diaphragm 51 via the bed 75. At the lower end of the sliding member 36 of the valve body 32 connected to the second diaphragm 51, the spring 39 is arranged. Accordingly, when pressure in the pressure chamber 29 exceeds a predetermined pressure, the first diaphragm 41, the bed 75, the second diaphragm 51 and the valve body 32 are integrally moved in the valve opening direction against the spring 39.

Due to the foregoing, as shown in FIG. 2, an annular gap, that is, a valve hole is formed between the valve body 32 and the valve seat 61. Therefore, fluid flows from the first chamber 21 into the second chamber 22 through this valve hole. Next, fluid is discharged from the second chamber 22 through the outlet port 12 of the flow rate control device 10. As can be seen from FIG. 2, an area of the valve hole formed between the valve body 32 and the valve seat 61 is increased when the first diaphragm 41 is moved. Therefore, the flow rate of fluid discharged from the outlet port 12 is increased in accordance with the increase of the area of the valve hole. That is, in the flow rate control device 10 of the present invention, by adjusting an amount of movement of the first diaphragm 41, the bed 75, the second diaphragm 51 and the valve body 32, which are moved integrated with each other, the flow rate of fluid flowing out from the outlet port 12 is adjusted.

As described before, in the present invention, at least the valve seat 61 is made of a material, the heat deformation of which is smaller than that of the cylindrical portion 25. Accordingly, in the case where fluid of a high temperature and pressure is supplied into the flow rate control device 10, for example, in the case where steam is supplied into the flow rate control device 10, even when the cylindrical portion 25 expands in the radial direction, the valve seat 61 may not be deformed by heat. That is, since the valve seat 61 is made of a material, the heat deformation of which is relatively small, the durability of the valve seat 61 can be ensured.

In the first embodiment of the present invention, the tightening member 65 is arranged and fixed around the valve seat 61. Therefore, even when the temperature is raised to a sufficiently high value for expanding the cylindrical member 25, the cylindrical portion 25 is seldom deformed by heat. Accordingly, there is no possibility that a redundant gap is formed between the valve body 32 and the valve seat 61. Therefore, the valve body 32 and the valve seat 61 are not damaged. Due to the above structure, according to the flow rate control device 10 of the present invention, even in the case where fluid of high temperature and pressure is supplied, the flow rate can be stably adjusted.

In this connection, as described before, in the case where the valve body 32 is made of a material, the heat deformation of which is smaller than that of the cylindrical portion 25, the durability of the valve body 32 can be ensured.

As can be seen from FIGS. 2 and 3, the rubber sheet 71 is arranged between the annular thin film portion 45 of the first diaphragm 41 and the annular curved portion 77 of the bed 75. Further, the rubber sheet 72 is arranged between the annular curved portion 77 of the bed 75 and the annular thin film portion 55 of the second diaphragm 51. These rubber sheets 71, 72 has the function of filling a gap between the first diaphragm 41 and the bed 75 and a gap between the bed 75 and the rubber sheet 72.

In the case where the rubber sheet 71 is not provided and a gap is formed between the first diaphragm 41 and the bed 75, when the pressure in the pressure chamber 29 rises, the annular thin film portion 45 can be greatly curved downward. Therefore, when the device is used over a long period of time, the annular thin film portion 45 of the first diaphragm 41 may be damaged. On the other hand, in the case where the first diaphragm 41 and the bed 75 are adjacent to each other, the annular thin film portion 45 of the first diaphragm 41 is seldom changed.

In this connection, in the present invention, the rubber sheets 71, 72, which are softer than the bed 75, are arranged as described before. In addition, these rubber sheets 71, 72 are appropriately elastic. Thus, the first and the second diaphragm 41, 51 can be appropriately deformed. Therefore, they can move integrally with the bed 75, and as a result, it is possible to protect the annular thin film portions 45, 55 of the diaphragm.

According to the present invention, two diaphragms 41, 51 are used. Therefore, for example, even in the case where steam or a liquid drug are supplied, the second chamber 22 and the pressure chamber 29, in which the above fluid flows, are not adjacent to each other via a single diaphragm. That is, in the present invention, when the two diaphragms 41, 51 are used, load given to the diaphragms 41, 51 can be reduced as light as possible.

As shown in the drawing, a space formed between the first diaphragm 41 and the second diaphragm 51 is open to atmospheric air through the ventilation port 17. In the case where steam is supplied to the flow rate control device 10, the pressure in the second chamber 22 is high. Further, the pressure in the pressure chamber 29, into which another fluid is introduced, is also high. Therefore, a space formed between the first diaphragm 41 and the second diaphragm 51 is pushed from both sides and the pressure in the space becomes a relatively high value. However, in the present invention, the space is open to atmospheric air through the ventilation hole 17. Accordingly, in the present invention, pressure in the space formed between the first diaphragm 41 and the second diaphragm 51 does not become a relatively high value. Accordingly, the first and the second diaphragm 41, 51 can be moved smoothly and the pressure in the pressure chamber 29 can be transmitted properly to the valve body 32 to slide the valve body 32. In this case, the space between the first diaphragm 41 and the second diaphragm 51 can be stabilized. Therefore, as a result, the rubber sheets 71, 72 arranged in the space can be protected.

Especially when fluid of a high temperature and pressure is supplied into the flow rate control device 10, for example, when steam is supplied into the flow rate control device 10, there is a possibility that the first diaphragm 41 and the second diaphragm 51 are deformed by heat. However, according to the present invention, the space formed between the first diaphragm 41 and the second diaphragm 51 is open to atmospheric air. Therefore, the heat deformation of these diaphragms can be suppressed to some degree.

In the vicinity of the end of the ventilation port 17, a screw thread (not shown) is formed. Especially, in the case where the flow rate control device 10 is used for supplying fluid, the temperature of which is relatively high, there is a possibility that condensation may form in the space between the first diaphragm 41 and the second diaphragm 51. In this case, when another joint (not shown) is attached to the ventilation port 17 through the screw thread, condensation generated in the space between the first diaphragm 41 and the second diaphragm 51 can be discharged outside the flow rate control device 10 through the ventilation port 17. That is, in the present invention, it is possible to use the ventilation port 17 as a drain port for the dew.

As shown in FIG. 2, at the housing bottom portion 19d of the flow rate control device 10, a ventilation port 27 is formed which extends from the spring chamber 15c, in which the spring 39 is arranged, to the outside. The ventilation port 27 functions to make the action of the spring 39 smooth by opening the spring chamber 15c to atmospheric air. In the same manner as that of the ventilation port 17, a screw thread (not shown) may be formed in the vicinity of the end of the ventilation port 27 and another joint may be attached to the ventilation port 27. Due to the above structure, condensation generated in the spring chamber 15c at the time of supplying fluid of a relatively high temperature can be discharged outside the flow rate control device 10 through the ventilation port 27.

Figure 5A:
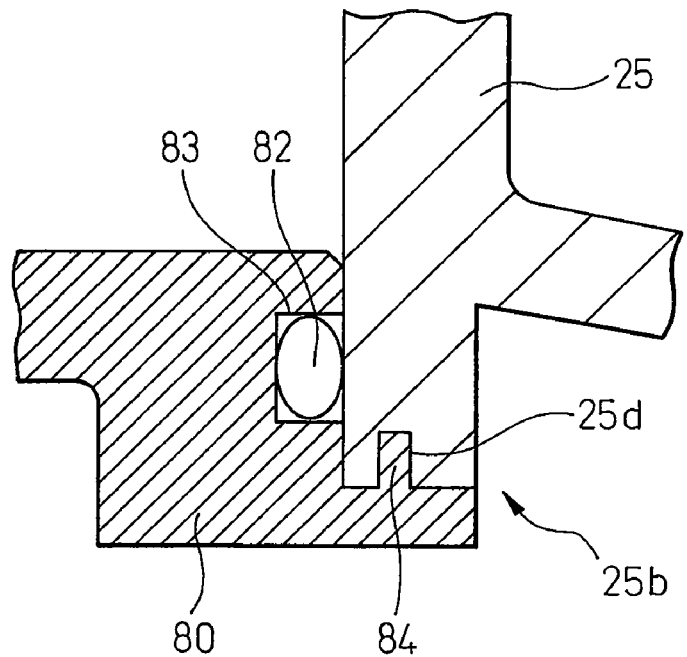
FIG. 5a is a partial enlarged view in which a proximal end of the cylindrical portion is shown being enlarged.

FIG. 5a is a partial enlarged view in which a proximal end of the cylindrical portion is shown enlarged. As shown in FIG. 5a, an annular groove 83 is formed on the outer circumferential face of the closing portion 80 engaged with the inner circumferential face of the cylindrical portion 25. In the annular groove 83, a seal member, for example, an O-ring 82 is arranged, so that the outer circumferential face of the closing portion 80 and the inner circumferential face of the cylindrical portion 25 can be sealed. As shown in the drawing, while the O-ring 82 is being pushed toward the inside in the radial direction by the inner circumferential face of the cylindrical portion 25, the O-ring 82 is inserted into the annular groove 83 of the closing portion 80.

Therefore, in the case where a minute gap is formed between the outer circumferential face of the closing portion 80 and the inner circumferential face of the cylindrical portion 25, the O-ring 82 is expanded outside in the radial direction, so that this gap can be sealed. Especially when the flow rate control device 10 supplies fluid of a high temperature and pressure, for example, when the flow rate control device 10 supplies steam, there is a possibility that the cylindrical portion 25 is expanded outside in the radial direction and a gap may be formed between the closing portion 80 and the cylindrical portion 25. However, according to the present invention, this gap is absorbed by the expansion of the O-ring. Therefore, leakage of fluid from between the cylindrical portion 25 and the closing portion 80 can be prevented. In the case where the flow rate control device 10 supplies steam, the cylindrical portion 25 is also deformed in the vertical direction. Since the O-ring 82 is pushed inside in the radial direction as shown in FIG. 5, even when the cylindrical portion 25 is deformed in the vertical direction, the O-ring 82 is can absorb this deformation to maintain the sealing.

At the proximal end 25b of the cylindrical portion 25, a recess groove 25d is formed. An annular protrusion 84, the shape of which corresponds to the recess groove 25d is provided on the closing portion 80. As shown in the drawing, the annular protrusion 84 of the closing portion 80 is engaged with the recess groove 25d of the cylindrical portion 25. Due to the above structure, even in the case where the fluid, which has leaked from between the cylindrical portion 25 and the closing portion 80 when the cylindrical portion 25 is deformed in the radial direction, flows over the O-ring 82 and reaches the proximal end portion 25b of the cylindrical portion 25, the flow of the fluid is stopped by the annular protrusion 84. Therefore, when the recess groove 25d and the annular protrusion 84 corresponding to the recess groove 25d are provided, the fluid can be prevented from leaking out from between the cylindrical portion 25 and the closing portion 80 in the case where the cylindrical portion 25 is deformed in the radial direction. Accordingly, the sealing can be maintained.

Figure 5B:
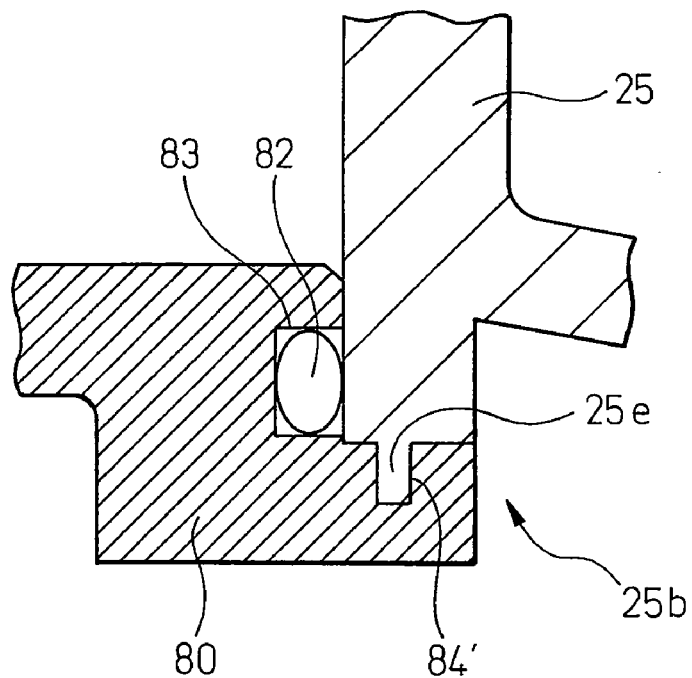
FIG. 5b is another partial enlarged view in which a proximal end of the cylindrical portion is shown being enlarged.

FIG. 5b is another partial enlarged view in which the proximal end of the cylindrical portion is shown enlarged. In the embodiment shown in FIG. 5b, an annular protrusion 25e is formed at the proximal end 25b of the cylindrical portion 25. A recess groove 84' corresponding to the annular protrusion 25e, is provided on the closing portion 80. Even in this structure, in the same manner as that described before, fluid can be prevented from leaking out from between the cylindrical portion 25 and the closing portion 80. Accordingly, sealing in the radial direction can be maintained.

In FIGS. 5a and 5b, the annular protrusions 84, 25e, the cross sections of which are rectangle, are shown and the recess grooves 25d, 84', the shapes of which correspond to those of the annular protrusions 84, 25e, are shown. However, the cross sections of the annular protrusions and the recess grooves may be formed into another shape, for example, the cross sections of the annular protrusions and the recess grooves may be triangular. Alternatively, it is possible to adopt such a structure that the annular protrusions 84, 25e are excluded and another O-ring arranged in the recess groove 25d, 84', and the same advantages as those described before can be provided.

Figure 6:
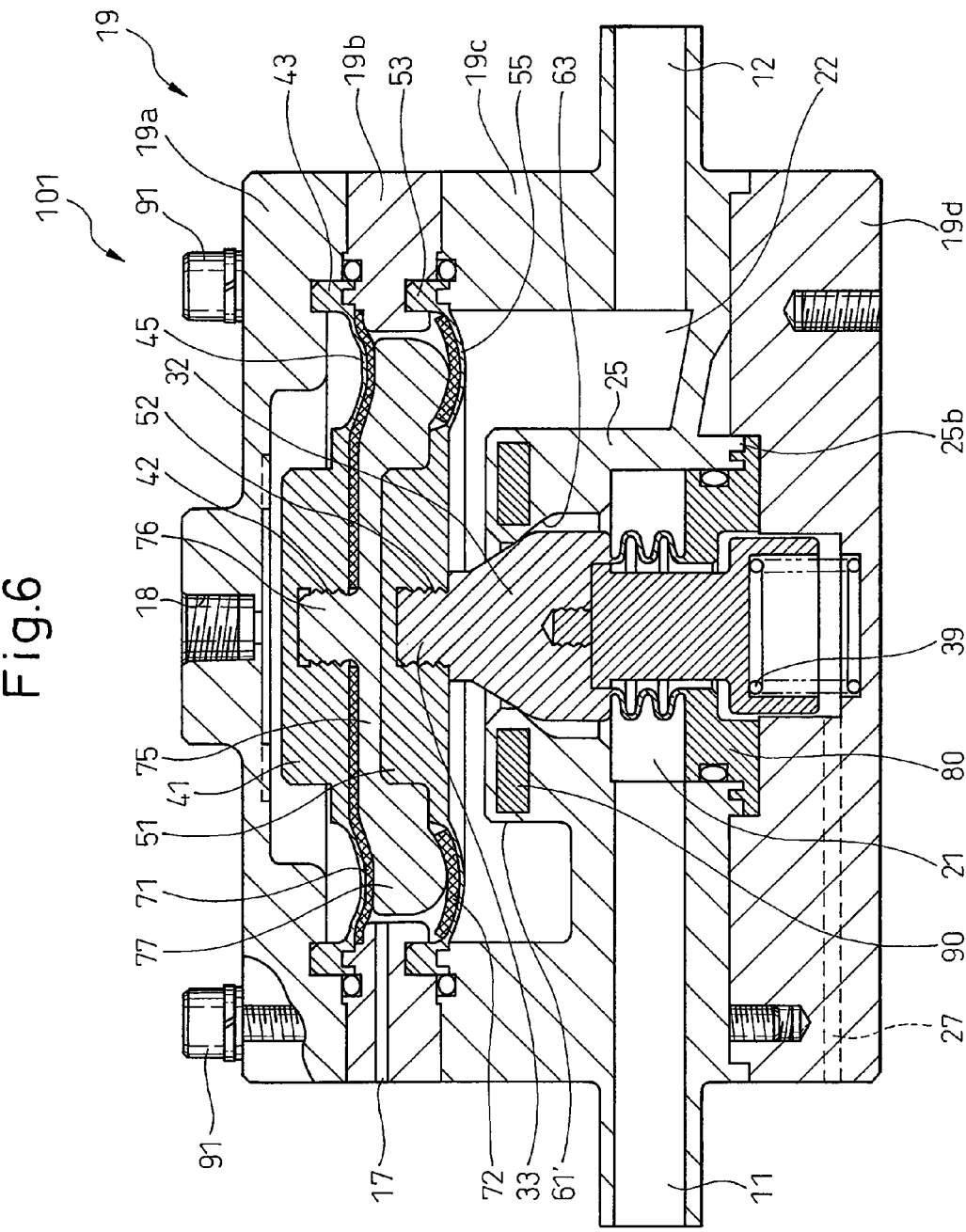
FIG. 6 is a sectional side view showing a state of opening a valve of the flow rate control device of the second embodiment of the present invention.

FIG. 6 is a sectional side view showing a state of opening a valve of the flow rate control device 10' of the second embodiment of the present invention. Same reference numerals are used to indicate same parts in the drawings including FIG. 6. Duplicate explanations are minimized or omitted here. In the second embodiment of the present invention, the valve body 32 is made of the same material as that of the housing barrel portion 19c, that is, the valve body 32 is made of polypropylene or fluororesin. The O-ring 38 explained referring to FIG. 4 is not provided in the valve body 32 of the flow rate control device 10'.

The size of the valve seat 61' of the flow rate control device 10' shown in FIG. 6 is substantially the same as the combined size of the valve seat 61 and the tightening member 65 of the first embodiment. In addition, the valve seat 61' is formed integrally with the cylindrical portion 25. That is, the valve seat 61' of the flow rate control device 10' is made of the same material as that of the housing barrel portion 19c, that is, the valve seat 61' of the flow rate control device 10' is made of polypropylene or fluororesin.

As shown in FIG. 6, a ring-shaped reinforcement member 90 is embedded in the valve seat 61'. For example, this reinforcement member 90 may be made of titanium or polyether etherketone (PEEK). In the embodiment shown in FIG. 6, a material, the heat deformation of which is smaller than that of the housing barrel portion 19c is selected as a material for the reinforcement member 90.

As shown in the drawing, the size of the reinforcement member 90 in the radial direction is a little smaller than the size of the top face of the valve seat 61'. The reinforcement member 90 extends in the axial direction from the top face of the valve seat 61 to the end point of the inside inclined face 63. That is, the reinforcement member 90 is embedded inside the surface of the valve seat 61' coming into contact with the valve body 32. Further, the entire reinforcement member 90 is embedded in the valve seat 61'. Therefore, as shown in the drawing, the reinforcement member 90 is not exposed to both the first chamber 21 or the second chamber 22.

When it is estimated that a fluid of a high temperature and pressure, for example, steam is supplied to the flow rate control device 10', although the valve seat 61' is made of resin material, since the reinforcement member 90 is embedded in the valve seat 61', the valve seat 61' is not expanded in the radial direction. That is, by the flow rate control device 10', flow rate can be stably adjusted without causing damage to the valve seat 61'. Further, as described before, since the valve body 32 and the valve seat 61' are made of the same resin material, when the valve seat 61' and the valve body 32 of the flow rate control device 10' are contacted to each other, no abrasion occurs, which is unlike the case in which two metals come into contact.

In the structure of the second embodiment of the present invention the metallic material is not exposed. Therefore, even in the case where fluid, which can corrode a metallic material, for example, when a specific liquid drug is used, it is possible to employ the flow rate control device 10' of the second embodiment. Further, the quantity of material, the heat deformation of which is small, to be used for the second embodiment becomes smaller than that of the first embodiment. Accordingly, the manufacturing cost of the flow rate control device 10' of the second embodiment can be reduced comparative the first embodiment. In this connection, it should be noted that a combination, in which some of the aforementioned embodiments are appropriately combined with each other, is included in the scope of the present invention.

Figure 7A:
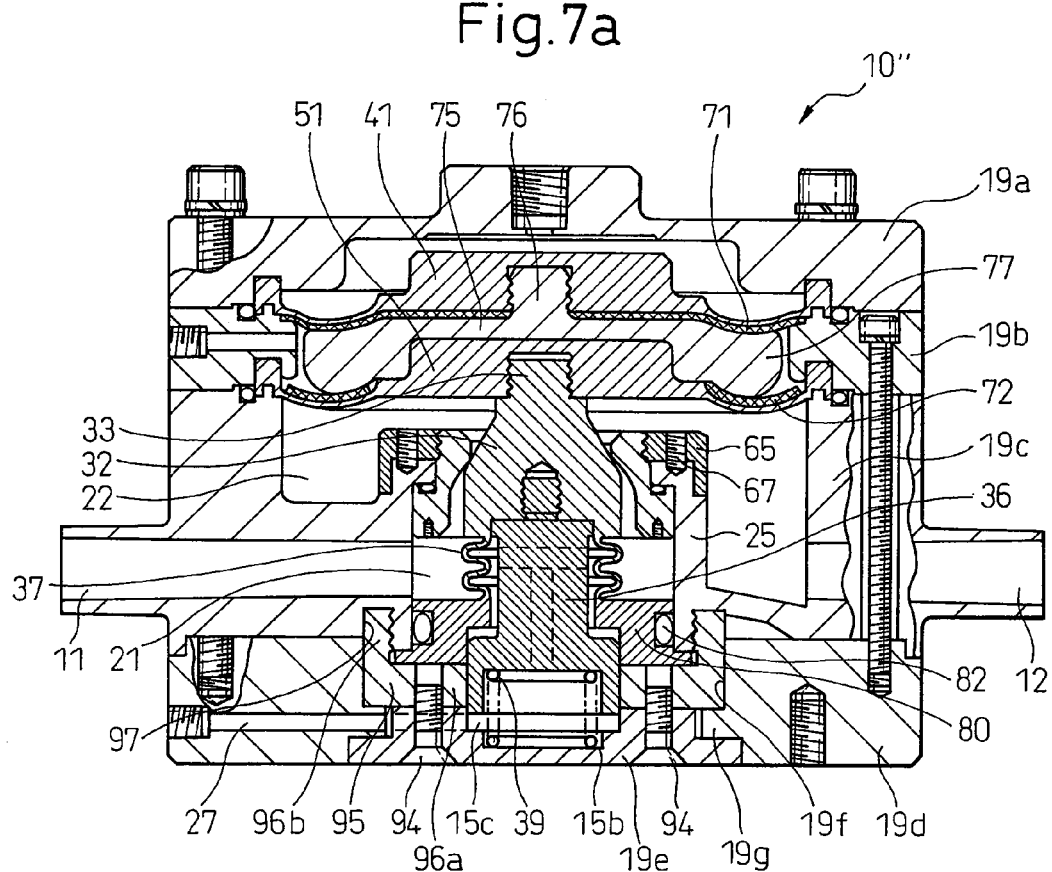
FIG. 7a is a sectional side view showing a state of opening a valve of the flow rate control device of the third embodiment of the present invention.
Figure 7B:
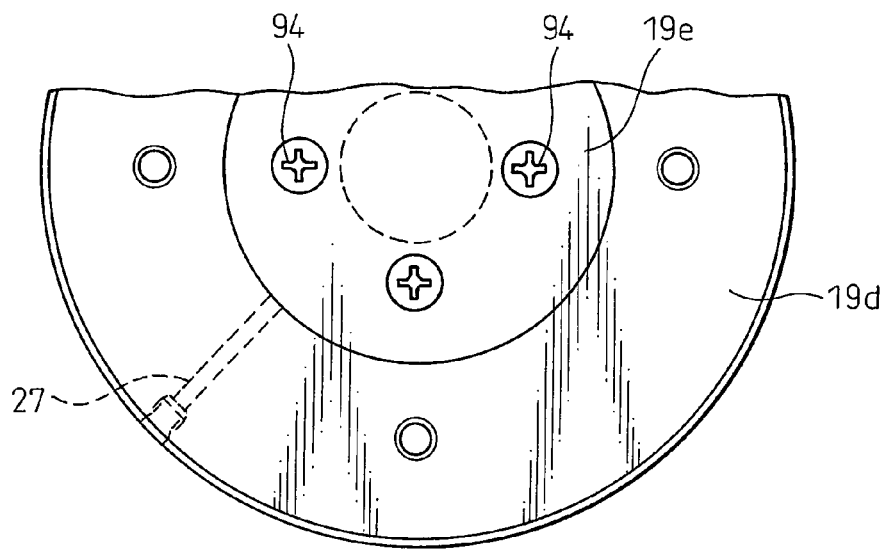
Figure 8:
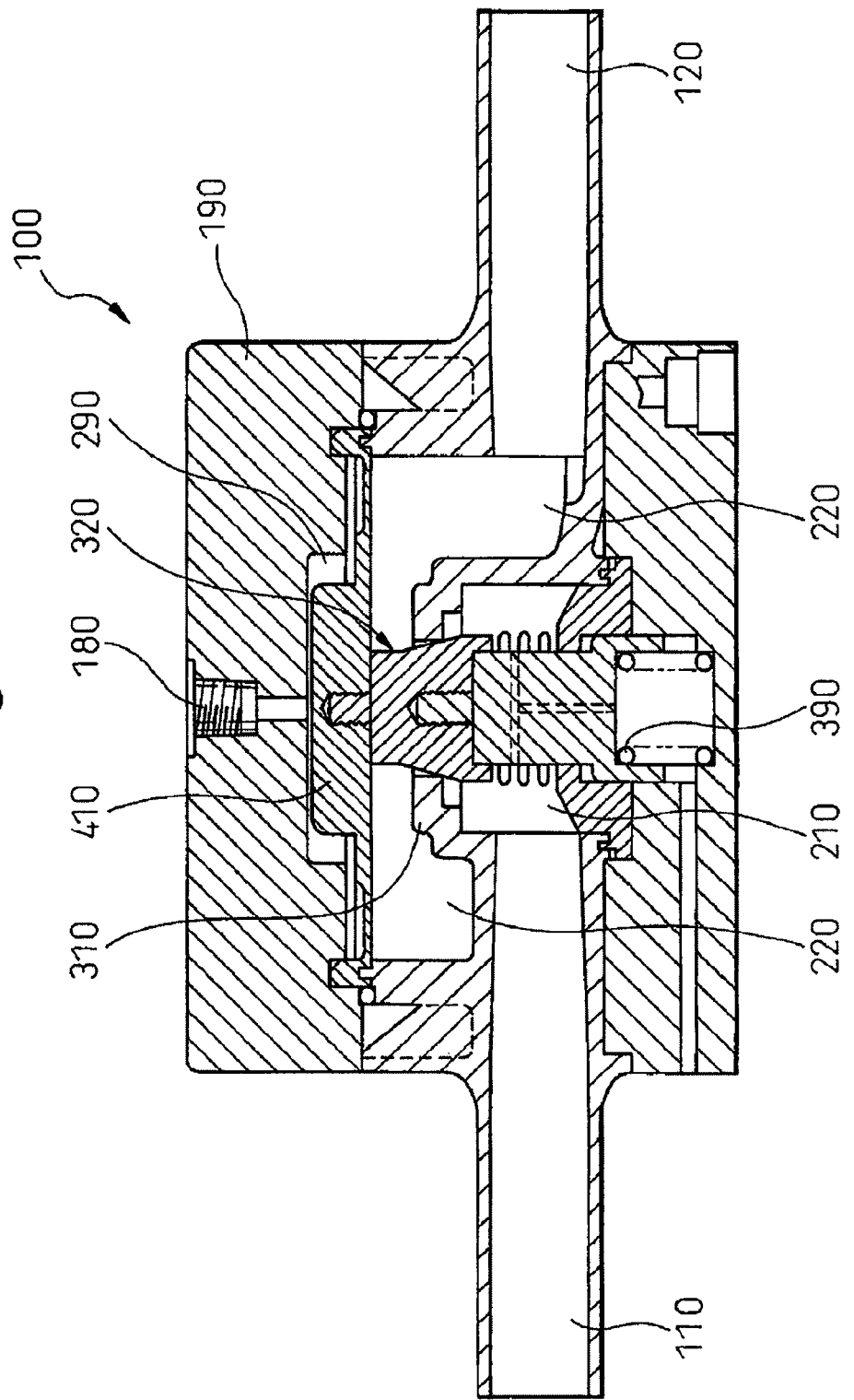
FIG. 8 is a sectional side view showing a flow rate control device of the prior art.

FIG. 7a is a sectional side view showing a state of opening a valve of the flow rate control device 10" of the third embodiment of the present invention. FIG. 7b is an end face view showing the flow rate control device shown in FIG. 7a. In the embodiment shown in FIG. 7a, an under cover 95 is provided, which covers the closing portion 80 from the lower side. The under cover 95 is formed into a substantial cup-shape. The under cover 95 includes: an end portion 96a composing a bottom of the cup; and a sleeve 96b, on the inner circumferential face of which a screw thread is formed, composing a circumferential face of the cup. It is preferable that the under cover 95 be made of a material, the rigidity of which is high, for example, it is preferable that the under cover 95 be made of stainless steel SUS304, etc.

In the third embodiment, in a bottom portion of the housing barrel portion 19c, a partial annular groove 97 is formed in such a manner that the partial annular groove 97 surrounds the cylindrical portion 25. On an inner circumferential face of this partial annular groove 97, a screw thread, which is screwed to a screw thread of the sleeve 96b, is formed. Accordingly, when the under cover 95 is arranged, the under cover 95 surrounds a side wall of the cylindrical portion 25 from the outside, while a forward end of the sleeve 96b engages with the partial annular groove 97. As described before, the under cover 95 is made of stainless steel SUS304. Therefore, the cylindrical portion 25 is reinforced by the under cover 95 from the side face and the lower face side.

When the under-cover 95 is screwed to the cylindrical portion 25, the closing portion 80 is received inside the cup-shaped under cover 95 and located above the end portion 96a. Especially when the under cover 95 is completely screwed to the cylindrical portion 25 as shown in the drawing, the flange portion of the closing portion 80 is interposed between the cylindrical portion 25 and the under cover 95.

In the present embodiment, a through-hole 19f is formed in the housing bottom portion 19d. On an inner wall of the through-hole 19f, an annular protrusion 19g protruding in the circumferential direction is provided. After the under cover 95 has been screwed, the housing bottom portion 19d is assembled to the housing barrel portion 19c as described before in such a manner that the under cover 95 can be received by the through-hole 19f of the housing bottom portion 19d. Due to the foregoing, the bottom portion of the under cover 95 is seated on the annular protrusion 19g of the housing bottom portion 19d.

In the above state, the under cover 95 is merely screwed to the cylindrical portion 25. Accordingly, there is a possibility that the under cover 95 may be loosened when it is rotated. Therefore, as shown in the drawing, a housing closing portion 19e having a flange is inserted into the through-hole 19f of the housing bottom portion 19d from the opposite side to the under cover 95. Due to the foregoing, the flange of the housing closing portion 19e is engaged with the annular protrusion 19g.

As shown in the drawing, a plurality of holes are formed at the end portion 96a of the under cover 95. In the housing closing portion 19e, a plurality of holes corresponding to the above holes are formed. As shown in FIGS. 7a and 7b, after the housing closing portion 19e has been assembled, screws 94 are inserted into these holes, so that the under cover 95 and the housing closing portion 19e can be fixed to each other. When the under cover 95 is fixed in this way, the under cover 95 can be prevented from being rotated in the circumferential direction. Therefore, the under cover 95 cannot be loosened.

In the above state, as can be seen from FIG. 7a, the annular protrusion 19g of the housing bottom portion 19d is interposed between the under cover 95 and the housing closing portion 19e. Therefore, the under cover 95 and the housing closing portion 19e are fixed to each other by screws 94. Accordingly, these parts are strongly fixed to each other.

At the end portion 96a of the under cover 95, an opening is formed in which a lower portion of the sliding member 36 is slid. A spring 39 of the sliding member 36 is arranged between the sliding member 36 and a recess portion 15b of the housing closing portion 19e.

As described above, since the under cover 95 is fixed by screws 94 in the third embodiment, even when steam is supplied, the cylindrical portion 25 of the housing barrel portion 19c and other parts are not deformed in the vertical direction. Further, the under cover 95 is received in the through-hole 19f in such a manner that the under cover 95 can engage with the annular protrusion 19g of the housing bottom portion 19d. Accordingly, there is no possibility that the cylindrical portion 25, the housing barrel portion 19c and the housing bottom portion 19d are deformed in the circumferential direction. That is, in the flow rate control device 10''' of the third embodiment, parts are not deformed. Therefore, it is possible to supply steam without leakage.

Since it is possible to supply steam without the deformation of the parts, it is preferable that the bellows 37 be made of high density PTFE (polytetra fluoroethylen), the durability of which is higher than that of the standard PTFE.

In the third embodiment, it is preferable that the outer circumferential diameter of the O-ring 82 is extended as large as possible without changing the shape of the recess portion, which receives the O-ring used in the closing portion 80. According to the above structure, the squeezing portion of the O-ring 82 is larger than that of the conventional structure, and as a result, it is possible to enhance the sealing property.

In this connection, in the case where the screw 67 used for the tightening member 65 is made of PEEK, etc., there is a possibility that the screw made of PEEK may be become eluted and flow into the second chamber 22 as particles at the time of supplying stream. For the above reasons, it is preferable that the screw 67 be made of titanium. It is more preferable that the screw be made of titanium which has already been etched. Due to the above structure, it is possible to suppress the screw from being eluted at the time of supplying stream.

The present invention has been explained above referring to the typical embodiments. However, changes, omissions and additions may be made by those skilled in the art without departing from the scope of the present invention.

DESCRIPTION OF REFERENCE NUMERALS AND SIGNS 10, 10', 10''' Flow rate control device
11 Inlet port
12 Outlet port
15a Sliding groove
15b Recess portion
17 Ventilation port
18 Pressure introduction port
19 Housing
19a Housing lid portion
19b Housing annular portion
19c Housing barrel portion
19d Housing bottom portion
19e Housing closing portion
21 First chamber
22 Second chamber
25 Cylindrical portion
25a Forward end
25b Proximal end
25c Inner circumferential face
25d Recess groove
25e Annular protrusion
26 Step portion
29 Pressure chamber
32 Valve body
33 Forward end
35 Connection member
36 Sliding member
37 Bellows
38 O-ring
39 Spring
41 First diaphragm
42 Hole
43 Annular edge portion
45 Annular thin film portion
51 Second diaphragm
52 Hole
53 Annular edge portion
55 Annular thin film portion
61 Valve seat
62 Outer circumferential face
63 Inside inclined face
64 Step portion
65 Tightening member
66 Extension portion
67 Screw
68 Inner circumferential face
71, 72 Rubber sheet
75 Bed
76 Protruding end portion
77 Annular curved portion
80 Closing portion
81 O-ring
82 O-ring
83 Annular groove
84 Annular protrusion
84' Recess groove
90 Reinforcement member
91 Screw
92 Screw
93 Pipe
94 Screw
95 Under cover

The invention claimed is:

1. A flow control device comprising:
a housing including a first chamber communicated with an inlet port and a second chamber communicated with an outlet port;
a cylindrical portion, which extends in the second chamber, for communicating the first chamber with the second chamber;
a valve seat provided at a forward end portion of the cylindrical portion;
a valve body for opening and closing the valve seat;
a pressure chamber having a pressure port disposed in the housing in communication with the second chamber;
a first flexible separation arrangement connected to a second flexible separation arrangement for sealingly separating the second chamber from the pressure chamber, wherein the first flexible separation arrangement is exposed to fluid in the pressure chamber and the second flexible separation arrangement is connected to the valve body and is exposed to fluid in the second chamber;
a bed disposed between the first and second flexible separation arrangements;

elastic members, which are softer than the bed, disposed between the first flexible separation arrangement and the bed and disposed between the second flexible separation arrangement and the bed; and a tightening arrangement which is configured to tighten an outer circumference of the forward end portion of the cylindrical portion, wherein the tightening arrangement includes an extension portion extending along a length of the forward end portion, wherein at least one of the valve seat and the valve body is made of a material which has a heat deformation that is smaller than a heat deformation of a material composing the cylindrical portion, wherein each of the first flexible separation arrangement and the second flexible separation arrangement includes an annular thin film portion which is curved toward the second chamber around the bed, and wherein the bed includes an annular curved portion having an upper face including a shape corresponding to a recessed face of the annular thin film portion of the first flexible separation arrangement and a lower face including a shape corresponding to the annular thin film portion of the second flexible separation arrangement.

2. The flow rate control device according to claim 1, further comprising a valve body seal arrangement for sealing the valve body, arranged in a portion of the valve body coming into contact with the valve seat.

3. The flow rate control device according to claim 1, wherein an exhaust passage is formed in the housing at the position between the first and second flexible separation arrangements.

4. The flow rate control device according to claim 1, further comprising:
  a closing portion for closing a proximal end of the cylindrical portion, wherein the valve body is movably connected to the closing portion; and
  a seal arrangement arranged in at least one position, which is located between the inner wall of the cylindrical portion and the closing portion, and the position which is located between the proximal edge portion of the cylindrical portion and the closing portion.

5. A flow control device comprising:
  a housing including a first chamber communicated with an inlet port and a second chamber communicated with an outlet port;
  a cylindrical portion, which extends in the second chamber, for communicating the first chamber with the second chamber;
  a valve seat provided at a forward end portion of the cylindrical portion;
  a valve body for opening and closing the valve seat;
  a pressure chamber having a pressure port disposed in the housing in communication with the second chamber;
  a first flexible separation arrangement connected to a second flexible separation arrangement for sealingly separating the second chamber from the pressure chamber, wherein the first flexible separation arrangement is exposed to fluid in the pressure chamber and the second flexible separation arrangement is connected to the valve body and is exposed to fluid in the second chamber;
  a bed disposed between the first and second flexible separation arrangements;
  elastic members, which are softer than the bed, disposed between the first flexible separation arrangement and the bed and disposed between the second flexible separation arrangement and the bed; and
  a tightening arrangement which is configured to tighten an outer circumference of the forward end portion of the cylindrical portion,
  wherein the tightening arrangement includes an extension portion extending along a length of the forward end portion,
  wherein a reinforcement member made of a material which has a heat deformation that is smaller than a heat deformation of a material composing the cylindrical portion, and that is at least partially embedded in the cylindrical portion,
  wherein each of the first flexible separation arrangement and the second flexible separation arrangement includes an annular thin film portion which is curved toward the second chamber around the bed, and
  wherein the bed includes an annular curved portion having an upper face including a shape corresponding to a recessed face of the annular thin film portion of the first flexible separation arrangement and a lower face including a shape corresponding to the annular thin film portion of the second flexible separation arrangement.

6. The flow rate control device according to claim 5, further comprising a valve body seal arrangement for sealing the valve body, arranged in a portion of the valve body coming into contact with the valve seat.

7. The flow rate control device according to claim 5, wherein an exhaust passage is formed in the housing at the position between the first and second flexible separation arrangements.

8. The flow rate control device according to claim 5, further comprising:
  a closing portion for closing a proximal end of the cylindrical portion, wherein the valve body is movably connected to the closing portion; and
  a seal arrangement arranged in at least one position, which is located between the inner wall of the cylindrical portion and the closing portion, and the position which is located between the proximal edge portion of the cylindrical portion and the closing portion.

9. A flow control device comprising:
  a housing including a first chamber communicated with an inlet port and a second chamber communicated with an outlet port;
  a cylindrical portion, which extends in the second chamber, for communicating the first chamber with the second chamber;
  a valve seat provided at a forward end portion of the cylindrical portion;
  a valve body for opening and closing the valve seat;
  a closing portion for closing a proximal end of the cylindrical portion;
  a cup-shaped support portion for surrounding and supporting the cylindrical portion while receiving the closing portion;
  a tightening arrangement which is configured to tighten an outer circumference of the forward end portion of the cylindrical portion;
  a pressure chamber having a pressure port disposed in the housing in communication with the second chamber;
  a first flexible separation arrangement connected to a second flexible separation arrangement for sealingly separating the second chamber from the pressure chamber, wherein the first flexible separation arrangement is exposed to fluid in the pressure chamber and the second flexible separation arrangement is connected to the valve body and is exposed to fluid in the second chamber;

a bed disposed between the first and second flexible separation arrangements; and elastic members, which are softer than the bed, disposed between the first flexible separation arrangement and the bed and disposed between the second flexible separation arrangement and the bed, wherein each of the first flexible separation arrangement and the second flexible separation arrangement includes an annular thin film portion which is curved toward the second chamber around the bed, wherein the bed includes an annular curved portion having an upper face including a shape corresponding to a recessed face of the annular thin film portion of the first flexible separation arrangement and a lower face including a shape corresponding to the annular thin film portion of the second flexible separation arrangement wherein the tightening arrangement includes an extension portion extending along a length of the forward end portion.

10. The flow rate control device according to claim 9, further comprising a valve body seal arrangement for sealing the valve body, arranged in a portion of the valve body coming into contact with the valve seat.

11. The flow rate control device according to claim 9, wherein an exhaust passage is formed in the housing at the position between the first and second flexible separation arrangements.

12. The flow rate control device according to claim 9, further comprising:
   a closing portion for closing a proximal end of the cylindrical portion, wherein the valve body is movably connected to the closing portion; and
   a seal arrangement arranged in at least one position, which is located between the inner wall of the cylindrical portion and the closing portion, and the position which is located between the proximal edge portion of the cylindrical portion and the closing portion.

13. A flow control device comprising:
   a housing including a first chamber communicated with an inlet port and a second chamber communicated with an outlet port, the housing also including a pressure chamber communicated with the second chamber and having a pressure port;
   a cylindrical portion, which extends in the second chamber, for communicating the first chamber with the second chamber;
   a valve seat provided at a forward end portion of the cylindrical portion;
   a valve body for opening and closing the valve seat;
   a first flexible separation arrangement and a second flexible separation arrangement, the first and second separation arrangements being connected to each other, for sealingly separating the second chamber and the pressure chamber from each other, wherein the first flexible separation arrangement is exposed to fluid in the pressure chamber and the second flexible separation arrangement is exposed to fluid in the second chamber and is connected to the valve body;
   a bed arranged between the first and second flexible separation arrangements;
   a tightening arrangement which is configured to tighten an outer circumference of the forward end portion of the cylindrical portion; and
   elastic members, which are softer than the bed, disposed between the first flexible separation arrangement and the bed and disposed between the second flexible separation arrangement and the bed,
   wherein the tightening arrangement includes an extension portion extending along a length of the forward end portion,
   wherein each of the first flexible separation arrangement and the second flexible separation arrangement includes an annular thin film portion which is curved toward the second chamber around the bed, and
   wherein the bed includes an annular curved portion having an upper face including a shape corresponding to a recessed face of the annular thin film portion of the first flexible separation arrangement and a lower face including a shape corresponding to the annular thin film portion of the second flexible separation arrangement.

14. The flow rate control device according to claim 13, wherein an exhaust passage is formed in the housing at the position between the first and second flexible separation arrangements.

15. The flow rate control device according to claim 13, further comprising:
   a closing portion for closing a proximal end of the cylindrical portion, wherein the valve body is movably connected to the closing portion; and
   a seal arrangement arranged in at least one position, which is located between the inner wall of the cylindrical portion and the closing portion, and the position which is located between the base edge portion of the cylindrical portion and the closing portion.

16. The flow control device according to claim 13, further comprising:
   a reinforcement member made of material having a heat deformation which is smaller than a heat deformation of a material composing the cylindrical portion, is at least partially embedded in the cylindrical portion,
   wherein the reinforcement member is isolated from both the first chamber and the second chamber.

17. The flow control device according to claim 13, wherein at least one of the valve seat and the valve body is made of a material having a heat deformation which is smaller than a heat deformation of a material composing the cylindrical portion.

18. The flow rate control device according to claim 13, further comprising a valve body seal arrangement for sealing the valve body, arranged in a portion of the valve body coming into contact with the valve seat.

* * * * *